(12) United States Patent
Moore et al.

(10) Patent No.: US 11,297,622 B1
(45) Date of Patent: Apr. 5, 2022

(54) DYNAMIC HIERARCHICAL RESERVED RESOURCE ALLOCATION

(71) Applicant: AT&T Intellectual Property I, L.P., Atlanta, GA (US)

(72) Inventors: Thomas Moore, Dallas, TX (US); Bryan Sokolik, Rockledge, FL (US); Bhushan Padhiar, Plano, TX (US); William Hurst, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 54 days.

(21) Appl. No.: 16/017,779

(22) Filed: Jun. 25, 2018

(51) Int. Cl.
*H04W 72/04* (2009.01)
*H04L 12/911* (2013.01)
*H04L 47/70* (2022.01)

(52) U.S. Cl.
CPC ........... *H04W 72/048* (2013.01); *H04L 47/82* (2013.01)

(58) Field of Classification Search
None
See application file for complete search history.

(56) References Cited

U.S. PATENT DOCUMENTS

| | | | |
|---|---|---|---|
| 9,442,764 B2* | 9/2016 | Chen | G06F 9/5011 |
| 9,733,987 B2 | 8/2017 | Herdrich et al. | |
| 9,760,391 B2 | 9/2017 | Kiess et al. | |
| 9,769,694 B2 | 9/2017 | Chou et al. | |
| 9,847,915 B2 | 12/2017 | Ashwood-Smith et al. | |
| 9,892,007 B2 | 2/2018 | Yang et al. | |
| 2016/0234082 A1 | 8/2016 | Xia et al. | |
| 2016/0381146 A1* | 12/2016 | Zhang | H04L 67/141 709/228 |
| 2017/0118286 A1* | 4/2017 | Matsuda | H04L 47/80 |
| 2017/0126792 A1 | 5/2017 | Halpern et al. | |
| 2017/0142206 A1 | 5/2017 | Kodaypak et al. | |
| 2017/0249180 A1 | 8/2017 | Chen et al. | |
| 2017/0295066 A1 | 10/2017 | Ellis et al. | |
| 2017/0295108 A1* | 10/2017 | Mahindru | H04L 47/805 |
| 2017/0371717 A1 | 12/2017 | Kiess et al. | |
| 2018/0013586 A1 | 1/2018 | Wang | |
| 2018/0062945 A1 | 3/2018 | Ni et al. | |
| 2018/0331885 A1* | 11/2018 | Raymond | H04L 47/76 |

\* cited by examiner

*Primary Examiner* — Saba Tsegaye
(74) *Attorney, Agent, or Firm* — Guntin & Gust, PLC; Douglas Schnabel

(57) ABSTRACT

A method includes receiving a request to allocate an instantiation of a network function and information indicative of resource needs of the instantiation. The resource needs include at least one resiliency requirement. The method includes computing a resource map comprising a global tier and a regional tier and comparing the resource needs with the resource map to determine an allocation solution. The method also includes, based on the allocation solution, allocating resources to the instantiation. The resources include a first resource of the global tier and a second resource of the regional tier.

20 Claims, 9 Drawing Sheets

DYNAMIC HIERARCHICAL RESERVED RESOURCE ALLOCATION

TECHNICAL FIELD

This disclosure relates generally to cloud network resource management and, more specifically, to reservation of computing resources for different levels of resiliency within a local cloud environment and between multiple geographically distributed cloud environments.

BACKGROUND

To provide a service or application (generally "an application") using virtualized network platforms, a set of one or more virtual network functions (VNFs) and physical network functions (PNFs) may be instantiated on general purpose hardware by allocating computing resources to that application. These computing sources may be located in local datacenters, geographically redundant datacenters, or a combination thereof.

The problem is that there is not yet a solution for the orchestration allocation and relocation of reserved computing resources that protect against the potential loss of different levels of local and geographically distributed computing resources. In the case of a variety of multiple failures of the normal computing capacity in local datacenters or geographically redundant data centers, there is not yet a definition of a hierarchical and rule-based algorithm to prioritize the relocation of the reserved computing resources, according to rules established by a cloud infrastructure operator for the service.

This disclosure is directed to advancing the state of the technological arts by solving one or more of the problems in the existing technology.

SUMMARY

In an aspect, a cloud orchestrator may include a network connection for connecting to a cloud network, a processor communicatively coupled to the network connection, and memory storing instructions that cause the processor to effectuate operations. The operations may include receiving a request to allocate an instantiation of a network function and information indicative of resource needs of the instantiation. The resource needs may include at least one resiliency requirement. The operations may also include computing a resource map of the cloud network. The resource map may include a global tier and a regional tier. The operations may include comparing the resource needs with the resource map to determine an allocation solution and, based on the allocation solution, allocating resources to the instantiation. The resources comprise a first resource of the global tier and a second resource of the regional tier.

In another aspect, a method may include receiving a request to allocate an instantiation of a network function and information indicative of resource needs of the instantiation. The resource needs may include at least one resiliency requirement. The method may include computing a resource map comprising a global tier and a regional tier and comparing the resource needs with the resource map to determine an allocation solution. The method may include, based on the allocation solution, allocating resources to the instantiation. The resources may include a first resource of the global tier and a second resource of the regional tier.

According to yet another aspect, non-transitory computer readable storage medium storing instructions that cause a processor executing the instructions to effectuate operations. The operations may include receiving a request to allocate an instantiation of a network function and determining resource needs of the instantiation based on a user input. The resource needs may include at least one resiliency requirement. The operations may include computing a resource map comprising hierarchy of datacenters and comparing the resource needs with the resource map to determine an allocation solution. The operations may include based on the allocation solution, allocating resources of the datacenters to the instantiation. The resources may satisfy the at least one resiliency requirement.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Within a datacenter, there are multiple levels of computing capacity, such as individual computing hosts, and availability zones, which may fail or become unavailable for maintenance reasons. Failure may arise from location-specific issues like power outages. Additional geographically diverse datacenters provide another level of availability in the case of the loss or reservation of other datacenters. In the case of multiple failures in local data centers and geographically diverse data centers, a unified resource allocation and relocation algorithm, designed based upon rules defined by operators, can be used to handle the availability of a service.

This disclosure is directed to a cloud orchestrator that receives rules and implementation requirements, compares those requirements with the available resources across multiple datacenters, and allocates resources of those datacenters to a VNF based on the requirements. Further, in the event of failure or unavailability of resources, the cloud orchestrator relocates the VNFs to different resources.

Figure 1A:
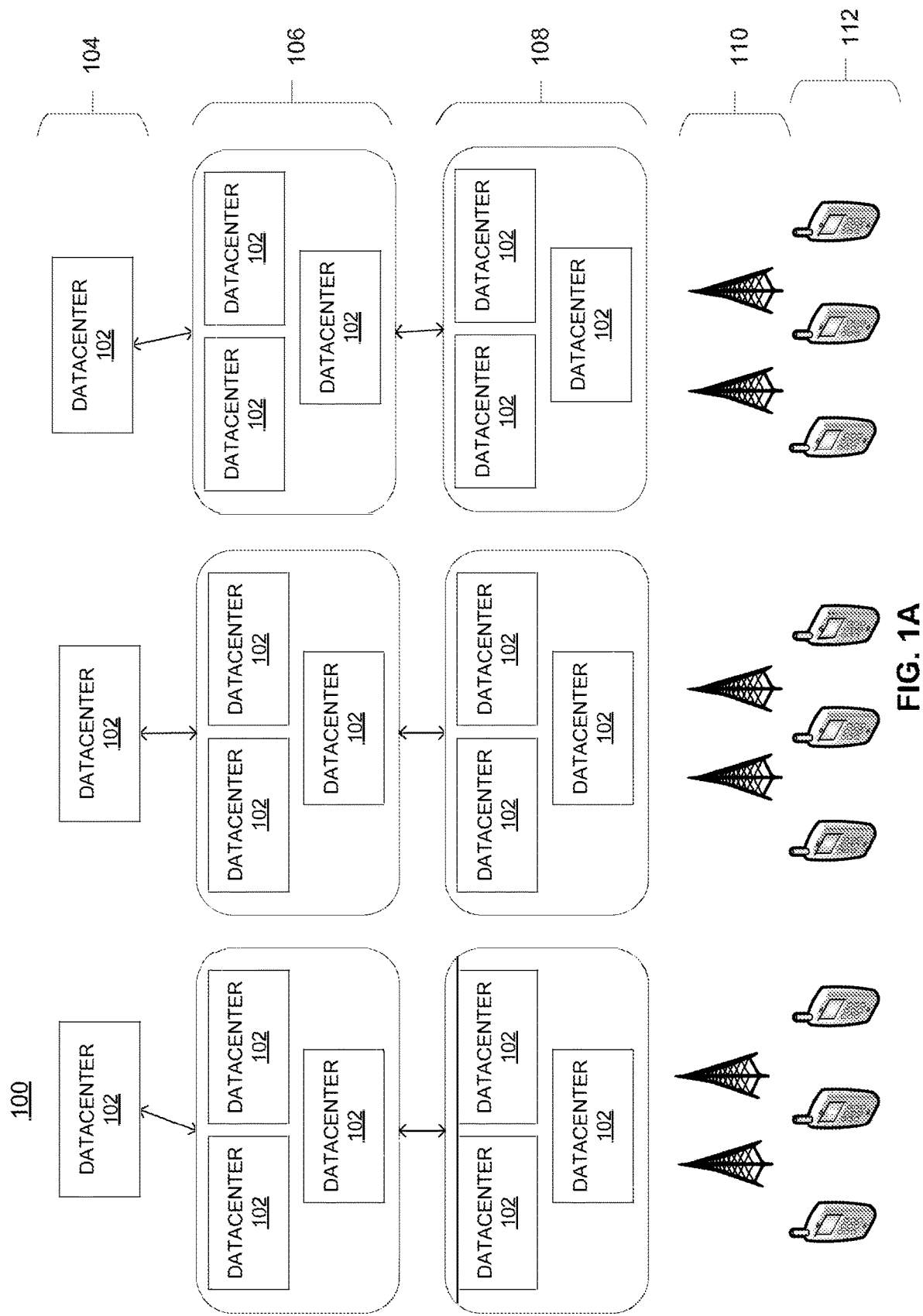
FIG. 1A is a representation of an exemplary network.

FIG. 1A is a representation of an exemplary network 100. Network 100 may be or include a software defined network ("SDN") in which elements of network 100 are distributed across multiple datacenters 102.

Within data center 102, there may be multiple levels of computing capacity, such as individual computing hosts and availability zones. Further, certain portions of computing resources within datacenter 102 may be reserved, such as for specific services. The functionality and configuration of a datacenter 102 is discussed in more detail below with reference to FIG. 1B.

Within the collection of datacenters 102, there may be hierarchical control. This control may be present in all interactions of such datacenters 102, or it may exist based on the specific needs of an instantiation of a network function. This hierarchy may be represented in multiple tiers. The higher the tier, the higher the latency for applications, particularly with respect to their interactions with edge devices and end users. Thus, low-latency applications may be instantiated on lower tiers in order to meet latency requirements that otherwise could not be met if instantiated on the higher tier datacenters 102.

At the highest point of the hierarchy, a global tier 104 may provide centralized control. Datacenters 102 in global tier 104 may communicate with (and exert some control over) datacenters 102 in the next lower tier, the regional tier 106. The regional tier 106 may be desired for geographic distribution of datacenters 102. In turn, datacenters 102 in regional tier 106 may communicate with (and exert some control over) datacenters 102 in the next lower tier, the edge tier 108. Edge tier 108 may control and manage a network edge 110, through which end devices 112 connect to and interact with network 100.

Figure 1B:
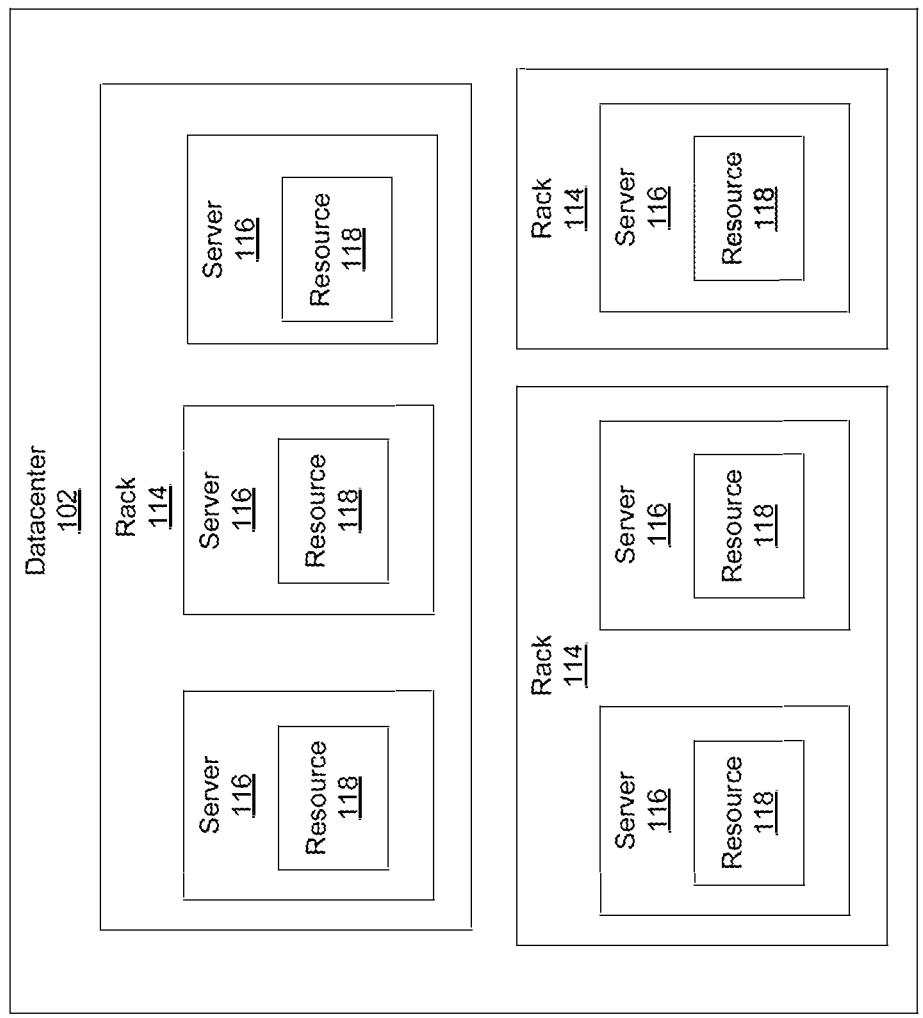
FIG. 1B is a representation of an exemplary datacenter.

FIG. 1B illustrates an exemplary configuration of datacenter 102. Each datacenter 102 may comprise one or more racks 114. In an aspect, rack 114 may refer to the physical housing or platform for multiple servers or other network equipment. In an aspect, rack 114 may also refer to the underlying network equipment. Each rack 114 may include one or more servers 116. Server 116 may comprise general purpose computer hardware or a computer. In an aspect, rack 114 may comprise a metal rack, and servers 116 of rack 114 may comprise blade servers that are physically mounted in or on rack 114.

Each server 116 may include one or more network resources 118, as illustrated. Servers 116 may be communicatively linked together (not shown) in any combination or arrangement. For example, all servers 116 within a given datacenter 102 or rack 114 may be in communication with one or more other servers 116. As another example, servers 116 in different racks 114 may be in communication with one or more other servers 116 in one or more different racks 114. Additionally or alternatively, racks 114 may be communicatively coupled together (not shown) in any combination or arrangement.

The characteristics of each datacenter 102, rack 114, and server 116 may differ. For example, the number of racks 114 within two datacenters 102 may vary. As another example, the number of servers 116 within two racks 114 may vary. Additionally or alternatively, the type or number of resources 118 within each server 116 may vary. In an aspect, rack 114 may be used to group servers 116 with the same resource characteristics. In another aspect, servers 116 within the same rack 114 may have different resource characteristics.

A single application may include many functional components, like network functions. These components may have dependencies upon each other and inter-communication patterns with certain quality of service (QoS) requirements, such as latency, locality, high availability, and security. Consequently, placement decisions—that is, decisions on how (and where) to implement network functions within network 100—may be based on the requirements of the network function and of the other network functions instantiated on network 100, holistically.

For example, placement, that is, allocation and relocation of instantiations of network functions in network 100, may be based on one or more resource requirements, affinity rules, diversity (or anti-affinity) rules, or pipe rules. A resource requirement may include a number or type of resource 118 that is required to instantiate a network function. An affinity rule may require that certain instantiations or elements of a network function (e.g., its underlying virtual machines) be hosted together on the same server 116, rack 114, datacenter 102, or tier (e.g., edge tier 108). A diversity rule (e.g., an anti-affinity rule) may require that certain instantiations or elements of a network function (e.g., its underlying virtual machines) be hosted on different servers 116, racks 114, datacenters 102, or tiers (e.g., edge tier 108 and regional tier 106). A pipe rule may require that a pairing of two elements of an instantiation of a network function (e.g., two virtual machines), or two instantiations, have a specific communication requirement (e.g., bandwidth or latency requirement).

Figure 1C:
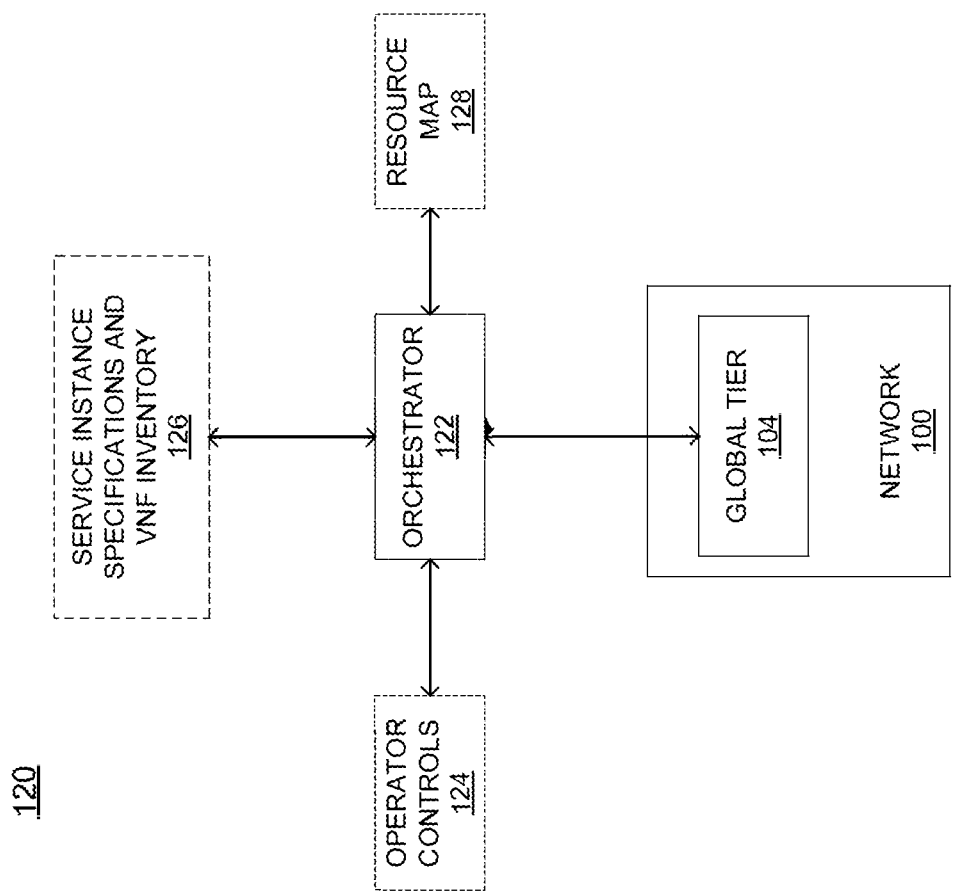
FIG. 1C is a schematic of the relationships of an orchestrator used to allocate and relocate instantiations within a network.

FIG. 1C illustrates a system 120 that includes the relationships an orchestrator 122 uses to allocate and relocate resources 118 across network 100. Instead of requiring multiple orchestrators to allocate resources at a datacenter 102 level or even at a regional level, orchestrator 122 uses a unified, rule-driven approach to the reservation of computing resources 118 for different levels of resiliency within a local cloud environment (e.g., datacenter 102) and between multiple, geographically distributed cloud environments. Orchestrator 120 may use algorithms to perform not only initial placement but also relocation and rebalancing of network functions for a service instance, based upon specifications of resiliency needs and priority for the service.

A cloud infrastructure operator for the service may establish rules to prioritize allocation (or relocation) of resources for a service instance. These rules may be input into a system via operator control system 124. This allows for the cloud infrastructure operator to customize rules based on the specific requirements of the network function or even the instantiation thereof. The rules can include, but are not limited to, local resiliency, which can address the reliability of resources 118 at datacenter 102. Additionally or alternatively the rules can include a geographic resiliency. The geographic resiliency may be related to the reliability of resources 118 at a specific geographic location, which can be addressed by selecting one or more datacenters 102 in that geographic location from which to reserve resources 118. For geographic resiliency, datacenters 102 may be selected based on their diverse regions that provide a similar amount of control in each region and a similar latency to managed edge network components or end devices from a second datacenter 102 in the same region. For example, the rules may indicate a preference for a specific geographical area (e.g., within the state of Georgia) rather than requiring a preference of a specific datacenter 102 (e.g., the XYZ datacenter).

The rules can also include control hierarchy requirements. For example, an instantiation may require a first set of resources 118 at a specific tier (e.g., global tier 104) and a second set of resources 118 that interact with the first set at a different tier (e.g., regional tier 106).

The rules may prioritize the resource needs of an instantiation. For example, the resource needs may include some "needs" that are, in actuality, preferences. Orchestrator 120 may be tasked with weighing these preferences against one another, both for the same instantiation and, weighing the preferences of different instantiations against one another. This can be facilitated by prioritizing a specific instantiation over another, prioritizing a specific preference over another, or a combination thereof. Orchestrator 122 may receive information indicative of the rules set forth by the operator—that is, the "resource needs"—via operator controls 124.

Orchestrator 122 also receives information from an inventory 126 that is currently being used to obtain a better understanding of the content and availability of resources within network 100. This may include service instance specifications—that is, the resource needs of a given application or network function—and the functionality of those network functions. Combined with the rules received from operator controls 124, this inventory may provide a comprehensive picture of what an instantiation will look like or how it will operate once implemented.

Orchestrator 122 may also receive network information from network 100. This includes the availability and configurations of datacenters 102, which can be as detailed as to indicate which resources 118 are available, reserved, in use, or offline (as a result of a failure or a maintenance operation).

Orchestrator may compile a resource map 128 based on this information. The resource map may represent relationships, specifications, and availability of resources 118. The resource map may be used to keep track of the allocation of resources 118, for the purposes of relocating resources 118 in the event of a failure, to accommodate new instantiation requests, or to rebalance network 100.

Figure 2:
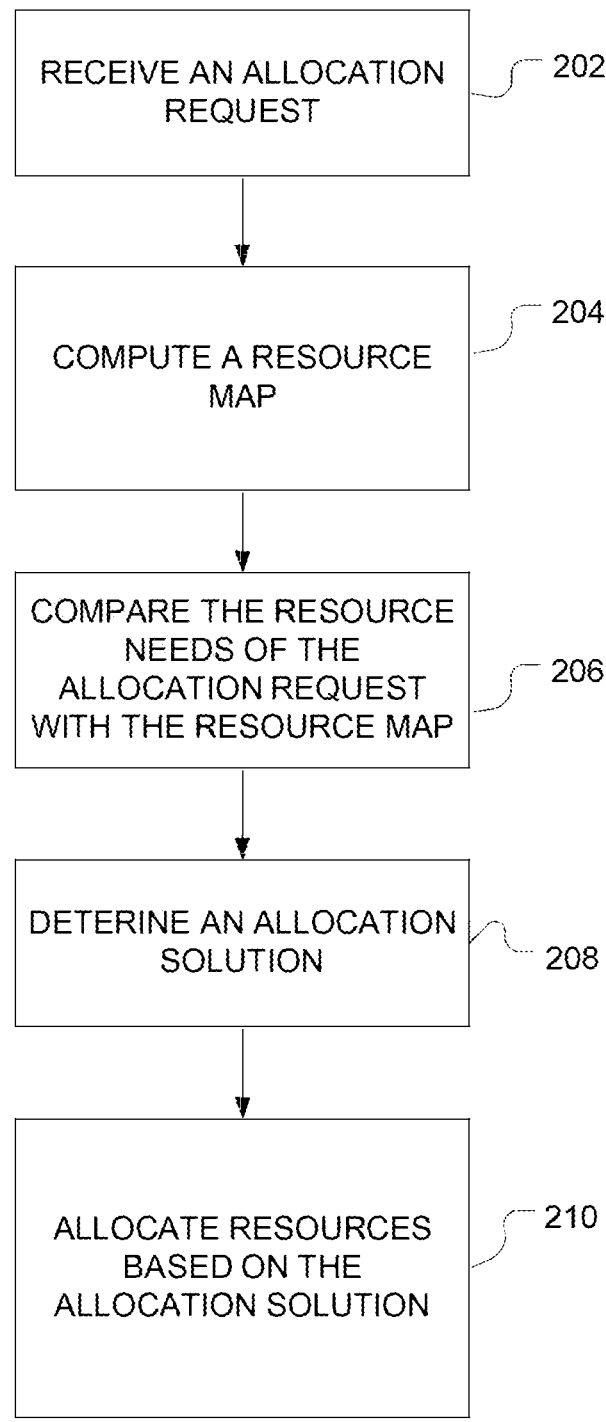
FIG. 2 is a representation of an exemplary method that may be used to allocate resource to instantiate a network function.

FIG. 2A illustrates an exemplary method 200 by which orchestrator 122 may allocate resources across multiple cloud computing environments for a network function. Variations of method 200 may achieve the same purpose as method 200. Thus, not all steps illustrated in FIG. 2 or described below are necessary for every implementation of method 200. Further, the following steps of method 200 are described using specific examples, but none of these examples should be interpreted as the only or necessary implementation of such steps.

In exemplary method 200, at step 202 orchestrator 122 may receive an allocation request to instantiate a network function. This request may include, or orchestrator 122 may otherwise obtain, information indicative of the resource needs. As discussed above, resource needs may be rules, which may be defined or input by a cloud operator. The resource needs may include resiliency, including local resiliency and/or geographic resiliency. Further information, including the specification of the network function, may be obtained by orchestrator 122. The resource needs may include a requirement or preference to be instantiated in a specific datacenter 102 or a geographic region or hierarchal tier.

At step 204 orchestrator 122 may compute resource map 128. Computing resource map 128 may be performed as an ongoing function that includes updating resource map 128 based on changes to network 100, including allocation of resources 118 and unavailability of datacenters 102. As discussed above, resource map 128 may include information indicating the different tiers of network 100. Resource map 128 may indicate which portions of network 100 are reserved or available, and it may include more detailed information for unavailable resources 118, such as an indication of the function to which such resources 118 are already assigned or may be offline.

At step 206 orchestrator 122 may compare the resource needs of the allocation request with resource map 128. This may result in identifying one or more possible ways in which resources 118 can be allocated to satisfy the resource needs of the network function. Multiple different allocations may satisfy the resource needs. For example, a first allocation may satisfy all of the requirements, but may not satisfy a noncritical preference, such as a geographic preference, while a second allocation may satisfy both the mandatory and noncritical resource needs. In some circumstances, this comparing may result in a conclusion that no placement would satisfy the resource needs of the allocation request. Depending upon priority of the request and the network functions already instantiated, this could result in operator controls 124 revising the rules, and resubmitting the request, or orchestrator 122 rebalancing or relocating resources of other network functions.

In some instances, the resource needs are broadly defined so that orchestrator 122 is tasked with interpreting the resource needs and comparing those interpretations with resource map 128. For example, the resource needs may indicate a broad geographic area, and comparing the resource needs to resource map 128 may include identifying the different datacenters 102 within that geographic area and then identifying which allocations are possible given the other resource needs and the availability within those datacenters.

At step 208 orchestrator 122 may determine an allocation solution. In circumstances in which only one configuration would satisfy the allocation needs, step 208 may simply mean selecting the allocation solution identified in step 206. In circumstances in which multiple allocations are available, step 208 may weigh the different allocations against one another, depending upon the rules set forth by operator controls 124. For example, step 208 may include computing and comparing resiliency scores for different allocation solutions. These resiliency scores may be based on the local resiliency and geographic resiliency of resources 118. For example, a particular allocation solution that satisfies all resource needs—including noncritical needs—may be given preference, particularly if the allocation request is a high priority request.

At step 210 orchestrator 122 may allocate (or cause to be allocated) resources 118. This allocation may comprise implementing the allocation solution. Orchestrator 122 may update resource map 128 to reflect that resources 118 allocated to the network function to satisfy the allocation request are in use. Real-time updating of resource map 128 allows for dynamic service instance relocations, potentially decreasing down time of network functions that can occur as the result of a network failure. In the same vein, resource map 128 may be updated to include predictive heat maps of the free resources 118 that would be available in the event of a resource failure. This information may be used to preemptively identify relocation solutions that can be implemented in the case of an actual resource failure.

Orchestrator 122 may also provide other, related functionality that allows for relocation of a network function to different resources 128, such as in the event of a failure of those resources 128, a more preferred allocation becoming available, or network rebalancing. Orchestrator 122 may allow an administrator to relocate service instances of network functions to other datacenters 102 in compliance with specifications of those network functions from inventory 126. Relocation can be prioritized, so that orchestrator 122 prioritizes relocation of high priority network functions, like those related to emergency communications, over other, lower priority network functions.

Further, orchestrator 128 may also react to the creation or availability of new datacenters 102 (or new resources 118). For example, orchestrator 128 may assess the resource needs of services instances of network functions—particularly to identify different assignments that can more efficiently use resources 118. That is, the introduction of new datacenters 102 or resources 118 may provide more optimized uses of resources 118 that may be implemented by reassigning resources 118 to the different service instances currently in use.

Finally, the functionality of orchestrator 122 may incorporate feedback systems that allow optimization of its operations, including the use of machine learning to react to automatic resiliency events or to detect and implement rebalancing solutions across network 100. Analytics of the probabilities and characteristics of relocation requests due to automatic resiliency events, or approved rebalancing actions, may be used to anticipate network changes and to proactively relocate network functions.

Figure 3:
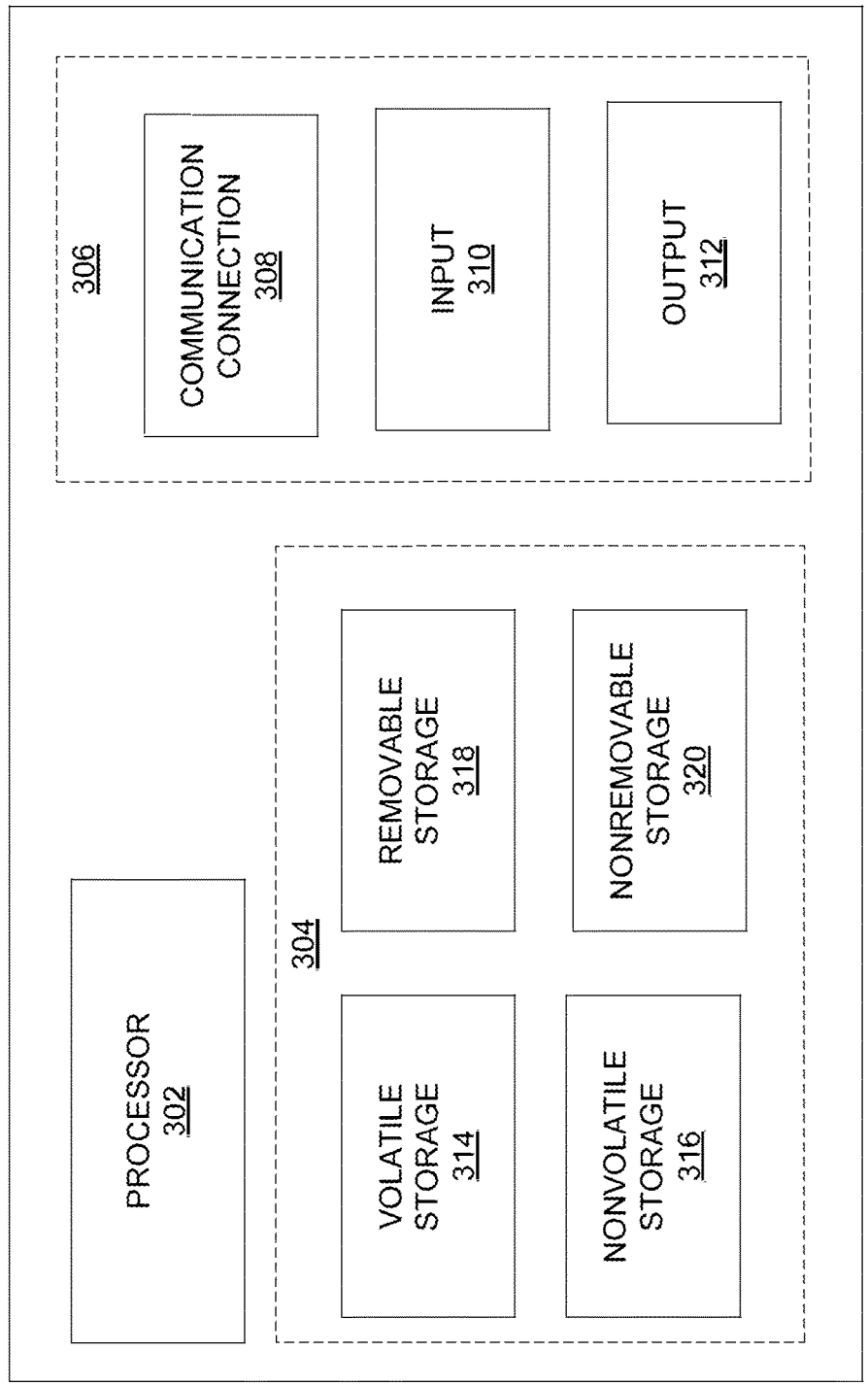
FIG. 3 is a schematic of an exemplary device that may be a component of the system of FIG. 1C.

FIG. 3 is a block diagram of network device 300 that may be connected to or comprise a component of network 100 or system 120. For example, network device 300 may implement one or more portions of method 200 for allocation of resources 118. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
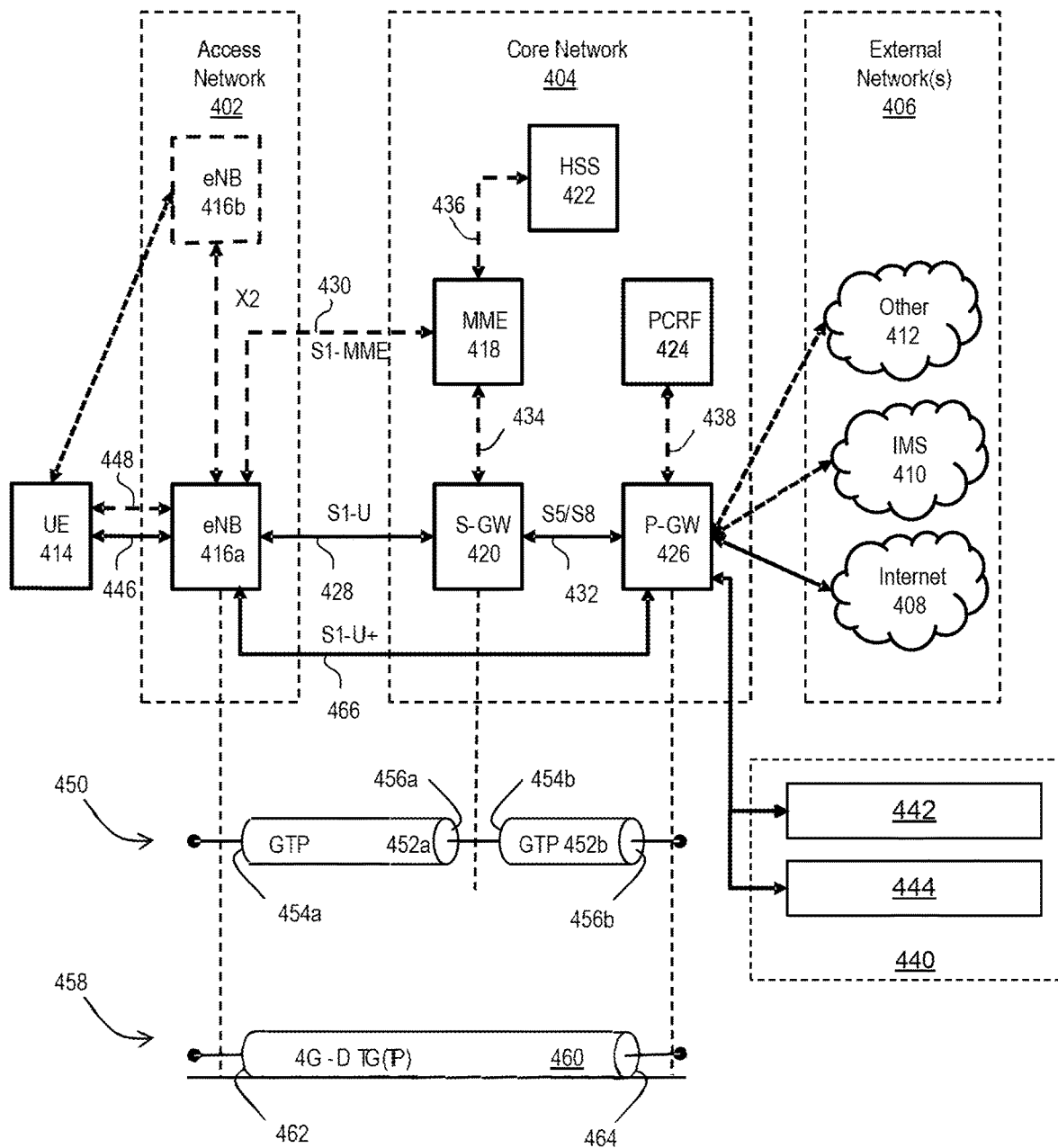
FIG. 4 depicts an exemplary communication system that provide wireless telecommunication services over wireless communication networks within which a network function may be instantiated using the disclosed systems or methods.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
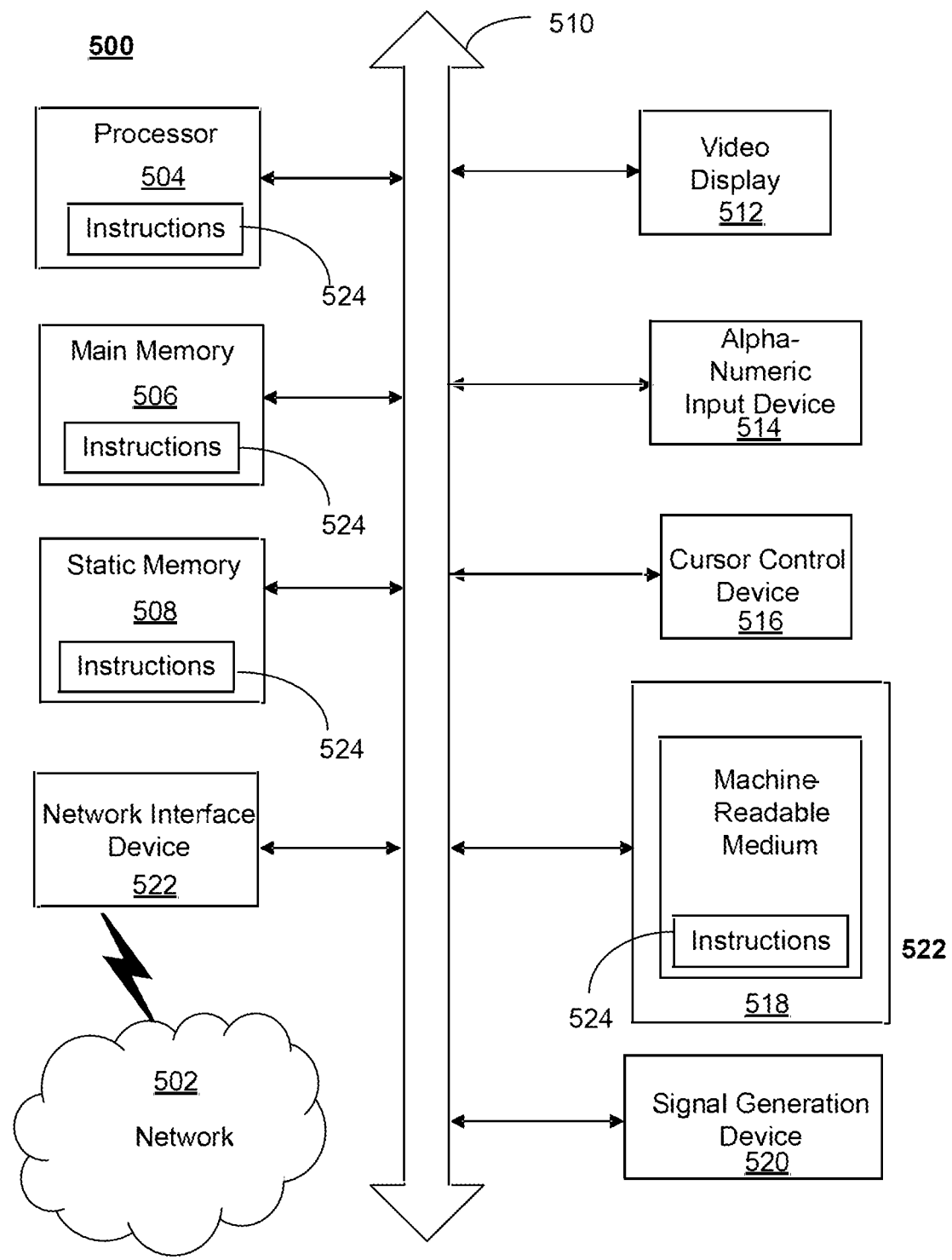
FIG. 5 depicts an exemplary communication system that provide wireless telecommunication services within which network functions may be allocated using the disclosed systems or methods.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
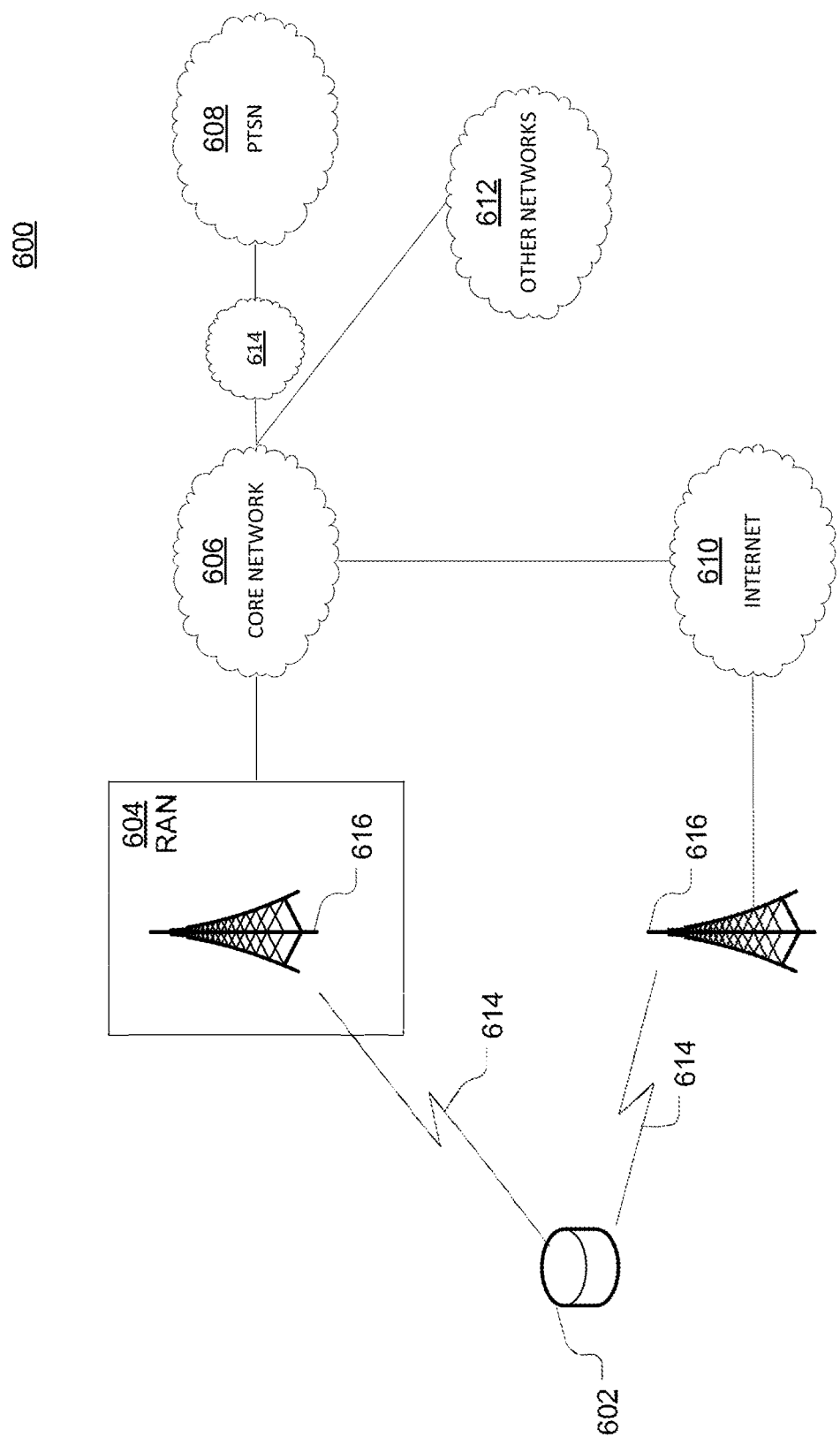
FIG. 6 is a diagram of an exemplary telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
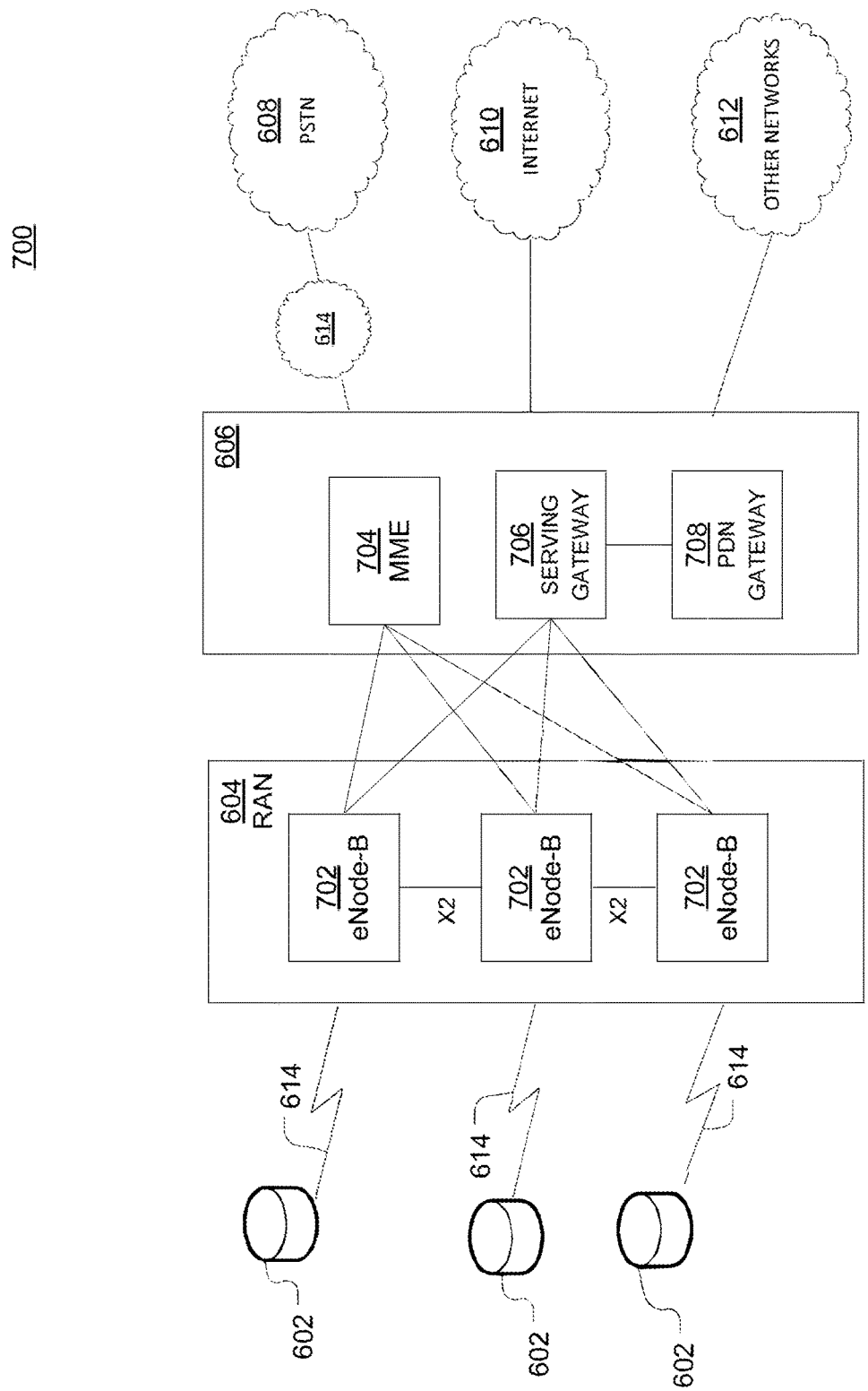
FIG. 7 is an example system diagram of a radio access network and a core network within which network functions may be allocated using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

The invention claimed is:

1. A cloud orchestrator comprising:
a network connection for connecting to a cloud network;
a processor communicatively coupled to the network connection; and
memory storing instructions that cause the processor to effectuate operations, the operations comprising:
receiving a request to allocate an instantiation of a network function, wherein the request comprises information indicative of resource requirements of the instantiation, wherein the resource requirements comprise at least one resiliency requirement, and wherein the at least one resiliency requirement comprises selecting one or more datacenters that provide a similar amount of control in a region and each of the one or more datacenters being associated with a similar latency to managed edgenetwork components in the region;
computing a resource map of the cloud network, the resource map comprising a globaltier, and a regional tier;
comparing the resource requirements with the resource map to determine a plurality ofallocation solutions;
computing a resiliency score for each of the plurality of allocation solutions, wherein the resiliency score is based on a local resiliency and a geographic resiliency of resources in the plurality of allocation solutions;
based on the resiliency score and the resiliency requirement, allocating resources to the instantiation, wherein the resources comprise a first resource of the global tier and a second resource of the regional tier;
responsive to the allocating the resources to the instantiation, periodically:
updating the resource map of the cloud network to generate a predictive heat map of free resources of the cloud network; and
determining a plurality of potential reallocation solutions for mitigating potential resource failures affecting the network function according to the predictive heat map of free resources of the cloud network;
detecting a first resource failure affecting the network function; and
implementing a first reallocation solution of the plurality of potential reallocation solutions responsive to the detecting the first resource failure affecting the network function.

2. The cloud orchestrator of claim 1, wherein the resource requirements comprise a geographic preference and selecting the second resource is based on the geographic preference.

3. The cloud orchestrator of claim 1, wherein the resiliency requirement comprises a local resiliency and a geographic resiliency.

4. The cloud orchestrator of claim 1, wherein the resource requirements comprise acontrol hierarchy that is satisfied by allocating the first resource from the global tier.

5. The cloud orchestrator of claim 1, wherein the information is further indicative of a geographic preference and the allocation solution is further based on comparing the geographic preference with the resource map.

6. The cloud orchestrator of claim 1, the operations further comprising:
   determining that a new datacenter has been created within the regional tier; and
   controlling relocation of the instantiation from the second resource to a third resource of the new datacenter.

7. The cloud orchestrator of claim 1, wherein the resource map further comprises an edge tier, wherein a first latency of the edge tier is lower than a second latency of the regional tier.

8. A method comprising:
   receiving, by a processing system including a processor, a request to allocate an instantiation of a network function, wherein the request comprises information indicative of resource requirements of the instantiation, wherein the resource requirements comprises at least one resiliency requirement, and wherein the at least one resiliency requirement comprises selecting one or more datacenters that provide a similar amount of control in a region and each of the one ormore datacenters being associated with a similar latency to managed edge network components in the region;
   computing, by the processing system, a resource map of a cloud network comprising a global tier and a regional tier;
   comparing, by the processing system, the resource requirements with the resource map to determine a plurality of allocation solutions;
   computing, by the processing system, a resiliency score for each of the plurality of allocation solutions, wherein the resiliency score is based on a local resiliency and a geographic resiliency of resources in the plurality of allocation solutions;
   based on the resiliency score and the resiliency requirement, allocating, by the processing system, resources to the instantiation, wherein the resources comprise a first resource of the global tier and a second resource of the regional tier;
   responsive to the allocating the resources to the instantiation, periodically:
      updating, by the processing system, the resource map of the cloud network to generate a predictive heat map of free resources of the cloud network; and
      determining, by the processing system, a plurality of potential reallocation solutions for mitigating potential resource failures affecting the network function according to the predictive heat map of free resources of the cloud network;
      detecting, by the processing system, a first resource failure affecting the network function; and
      implementing, by the processing system, a first reallocation solution of the plurality of potential reallocation solutions responsive to the detecting the first resource failure affecting the network function.

9. The method of claim 8, wherein the resource requirements further comprise at least one of an affinity rule or a non-affinity rule.

10. The method of claim 8, further comprising:
    determining, by the processing system, a failure or unavailability of at least a subset of the resources; and reallocating the instantiation based on the at least one of an affinity rule or a non-affinity rule.

11. The method of claim 8, wherein the resource map further comprises an edge tier, wherein a latency of the edge tier is lower than a latency of the global tier.

12. The method of claim 8, wherein the global tier comprises at least one global datacenter and the regional tier comprises at least one regional datacenter.

13. The method of claim 8, further comprising:
    comparing, by the processing system, the resource requirements to a second resource need of a second network function; and
    identifying, by the processing system, a first allocation solution and a second allocation solution based on the resource requirements, the second resource need, and the resource map, wherein the allocation solution is based on selecting the first allocation solution over thesecond allocation solution.

14. The method of claim 13, wherein the first allocation solution has a first reliability score that is higher than a second reliability score of the second allocation solution.

15. The method of claim 13, wherein the first allocation solution satisfies a geographic preference associated with the instantiation.

16. A non-transitory computer readable storage medium storing instructions that cause a processor executing the instructions to effectuate operations, the operations comprising:
    receiving a request to allocate an instantiation of a network function, wherein the request comprises information indicative of resource requirements of the instantiation, wherein the resource requirements comprise at least one resiliency requirement, and wherein the at least one resiliency requirement comprises selecting one or more datacenters that provide a similar amount of control in a region and each of the one or more datacenters being associated with a similar latency to managed edge network components in the region;
    computing a resource map of a cloud network comprising hierarchy of datacenters;
    comparing the resource requirements with the resource map to determine a plurality of allocationsolutions;
    computing a resiliency score for each of the plurality of allocation solutions;
    based on the resiliency score and the resiliency requirement, allocating resources of thedatacenters to the instantiation, wherein the resources satisfy the at least one resiliency requirement;
    responsive to the allocating the resources to the instantiation, periodically:
       updating the resource map of the cloud network to generate a predictive heat map of free resources of the cloud network; and
       determining a plurality of potential reallocation solutions for mitigating potential resource failures affecting the network function according to the predictive heat map of free resources of the cloud network;
       detecting a first resource failure affecting the network function; and
       implementing a first reallocation solution of the plurality of potential reallocation solutions responsive to the detecting the first resource failure affecting the network function.

17. The non-transitory computer readable storage medium of claim 16, wherein the hierarchy comprises a global tier and a regional tier.

18. The non-transitory computer readable storage medium of claim 16, wherein the at least one resiliency requirement comprises at least one of a local resiliency and a geographic resiliency.

19. The non-transitory computer readable storage medium of claim 16, wherein the operations further comprise:
   allocating second resources of the datacenters to a second instantiation of a second network function.

20. The non-transitory computer readable storage medium of claim 19, wherein the operations further comprise:
   detecting a failure affecting at least one of the resources and at least one of the second resources; and
   determining that the second instantiation has a higher priority than the instantiation; andreallocating third resources of the datacenters to the second instantiation prior to reallocating fourth resources of the datacenters to the instantiation.

\* \* \* \* \*

UNITED STATES PATENT AND TRADEMARK OFFICE
CERTIFICATE OF CORRECTION

PATENT NO. : 11,297,622 B1
APPLICATION NO. : 16/017779
DATED : April 5, 2022
INVENTOR(S) : Thomas Moore et al.

It is certified that error appears in the above-identified patent and that said Letters Patent is hereby corrected as shown below:

In the Claims

Claim 1, Column 18, Line 29, "edgenetwork" should read -- "edge network" --

Claim 1, Column 18, Line 31, "globaltier" should read -- "global tier" --

Claim 1, Column 18, Line 34, "ofallocation" should read -- "of allocation" --

Claim 4, Column 18, Line 66, "acontrol" should read -- "a control" --

Claim 8, Column 19, Line 25, "ormore" should read -- "or more" --

Claim 13, Column 20, Line 17, "thesecond" should read -- "the second" --

Claim 16, Column 20, Line 42, "allocationsolutions" should read -- "allocation solutions" --

Claim 16, Column 20, Line 46, "thedatacenters" should read -- "the data centers" --

Claim 20, Column 21, Line 14, "andreallocating" should read -- "and reallocating" --

Signed and Sealed this
Sixteenth Day of May, 2023

Katherine Kelly Vidal
*Director of the United States Patent and Trademark Office*